US012578748B2

(12) United States Patent
Tsuzuki

(10) Patent No.: US 12,578,748 B2
(45) Date of Patent: Mar. 17, 2026

(54) ACCELERATOR DEVICE

(71) Applicant: DENSO CORPORATION, Kariya-city (JP)

(72) Inventor: Yushi Tsuzuki, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 19/046,694

(22) Filed: Feb. 6, 2025

(65) Prior Publication Data

US 2025/0181103 A1 Jun. 5, 2025

Related U.S. Application Data

(63) Continuation of application No. PCT/JP2023/033024, filed on Sep. 11, 2023.

(30) Foreign Application Priority Data

Sep. 30, 2022 (JP) ................................ 2022-159080

(51) Int. Cl.
*G05G 1/46* (2008.04)
*G05G 1/44* (2008.04)

(52) U.S. Cl.
CPC ................ *G05G 1/46* (2013.01); *G05G 1/44* (2013.01)

(58) Field of Classification Search
None
See application file for complete search history.

(56) References Cited

U.S. PATENT DOCUMENTS

| | | | | |
|---|---|---|---|---|
| 9,475,386 | B2 * | 10/2016 | Horiuchi ............... | B60K 26/02 |
| 2014/0366678 | A1 | 12/2014 | Wurn et al. | |
| 2016/0246321 | A1 | 8/2016 | Ooba et al. | |

FOREIGN PATENT DOCUMENTS

| | | | |
|---|---|---|---|
| JP | 11020493 | A * | 1/1999 |
| JP | H1120493 | A | 1/1999 |

* cited by examiner

*Primary Examiner* — Vicky A Johnson
(74) *Attorney, Agent, or Firm* — Nixon & Vanderhye P.C.

(57) ABSTRACT

An accelerator device includes a pedal, an arm, a fastener member and a positioner. The pedal is configured to be depressed by a human driver. The arm is coupled to the pedal and is configured to receive a reaction force from a reaction force application device. The reaction force application device is configured to apply the reaction force to the arm against a pedal force applied from the human driver to the pedal. The fastener member is configured to fix the arm to the pedal. The positioner is configured to limit relative movement between the arm and the pedal. The arm has: a connector that is coupled with the pedal; and a through-hole that is formed at the connector and receives the fastener member through the through-hole. The positioner includes two positioning planar portions which are parallel to each other and are configured to engage with another member.

8 Claims, 16 Drawing Sheets

ACCELERATOR DEVICE

CROSS REFERENCE TO RELATED APPLICATIONS

This application is a continuation application of International Patent Application No. PCT/JP2023/033024 filed on Sep. 11, 2023, which designated the U.S. and claims the benefit of priority from Japanese Patent Application No. 2022-159080 filed on Sep. 30, 2022. The entire disclosures of all of the above applications are incorporated herein by reference.

TECHNICAL FIELD

The present disclosure relates to an accelerator device.

BACKGROUND

Previously, there has been proposed a reaction force application device configured to apply a reaction force against a pedal force of a human driver to a pedal of an accelerator device to be depressed by the driver.

For example, one previously proposed accelerator device includes an arm to which the reaction force is applied from the reaction force application device. An end portion of the arm, which is opposite to an end portion of the arm receiving the reaction force from the reaction force application device, is fixed to the pedal of the accelerator device with two fastener members.

SUMMARY

This section provides a general summary of the disclosure, and is not a comprehensive disclosure of its full scope or all of its features.

According to the present disclosure, there is provided an accelerator device including a pedal, an arm, a fastener member and a positioner. The pedal is configured to be depressed by a human driver. The arm is coupled to the pedal and is configured to receive a reaction force from a reaction force application device. The reaction force application device is configured to apply the reaction force to the arm against a pedal force applied from the human driver to the pedal. The fastener member is configured to fix the arm to the pedal. The positioner is configured to limit relative movement between the arm and the pedal. The arm has a connector and a through-hole. The connector (82) is coupled with the pedal. The through-hole is formed at the connector and receives the fastener member through the through-hole. The positioner includes two positioning planar portions which are parallel to each other and are configured to engage with another member.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
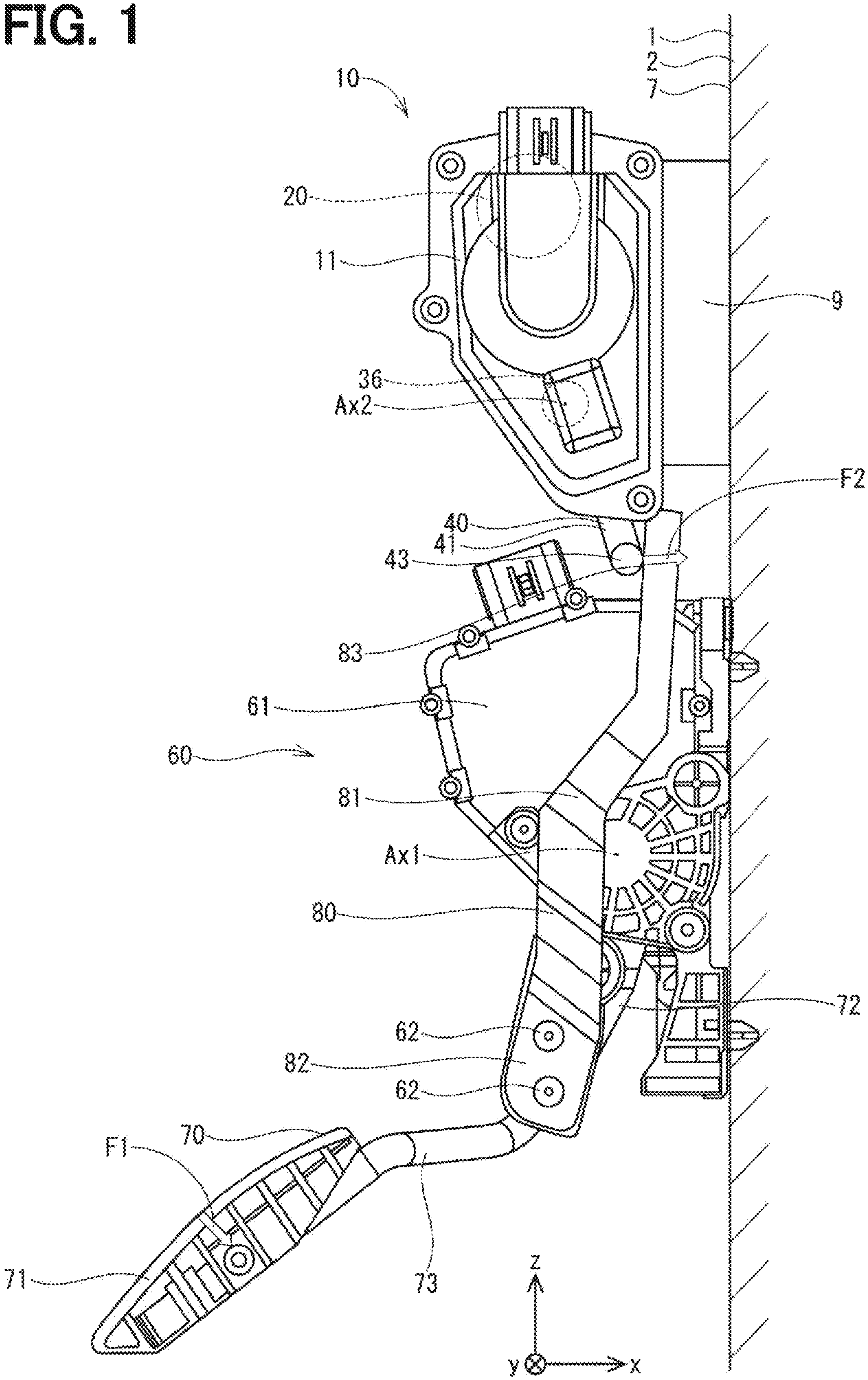
FIG. 1 is a diagram showing an accelerator device and a reaction force application device applied together with the accelerator device according to a first embodiment.

Previously, there has been proposed a reaction force application device configured to apply a reaction force against a pedal force of a human driver to a pedal of an accelerator device to be depressed by the driver.

For example, one previously proposed accelerator device includes an arm to which the reaction force is applied from the reaction force application device. An end portion of the arm, which is opposite to an end portion of the arm receiving the reaction force from the reaction force application device, is fixed to the pedal of the accelerator device with two fastener members.

In the previously proposed accelerator device, through-holes, which are configured to receive the fastener members, are formed at the arm. A predetermined gap is formed between each through-hole and the corresponding fastener member to ensure assemblability of the arm and the pedal in view of the variations in the shapes of the arm and the pedal. Due to this gap, there is a possibility of variation in the assembling position of the arm relative to the pedal. As a result, there is a possibility of variation in the reaction force applied to the arm by the reaction force application device.

An accelerator device according to the present disclosure includes a pedal, an arm, a fastener member and a positioner. The pedal is configured to be depressed by a human driver. The arm is coupled to the pedal and is configured to receive a reaction force from a reaction force application device. The reaction force application device is configured to apply the reaction force to the arm against a pedal force applied from the human driver to the pedal.

The fastener member is configured to fix the arm to the pedal. The positioner is configured to limit relative movement between the arm and the pedal. The arm has: a connector that is coupled with the pedal; and a through-hole that is formed at the connector and receives the fastener member through the through-hole.

The positioner includes two positioning planar portions which are parallel to each other and are configured to engage with another member. Therefore, by engaging the two positioning planar portions with the another member, it is possible to allow the relative movement between the arm and the pedal in a direction parallel to a plane of each of the positioning planar portions, while limiting relative movement between the arm and the pedal in a direction perpendicular to the plane of each of the positioning planar portions. Thus, the assemblability is ensured by allowing the relative movement between the arm and the pedal in the direction parallel to the plane of the positioning planar portion, and the variations in the assembling position are limited by limiting the relative movement between the arm and the pedal in the direction perpendicular to the plane of the positioning planar portion. Therefore, it is possible to achieve both the assemblability of the members and the reduction of the variations in the assembling position of the members.

Hereinafter, various embodiments for an accelerator device and a reaction force application device applied together with the accelerator device will be described with reference to the drawings. The same reference signs are given to substantially the same portions among the embodiments, and the redundant description thereof will be omitted for the sake of simplicity.

First Embodiment

Figure 2:
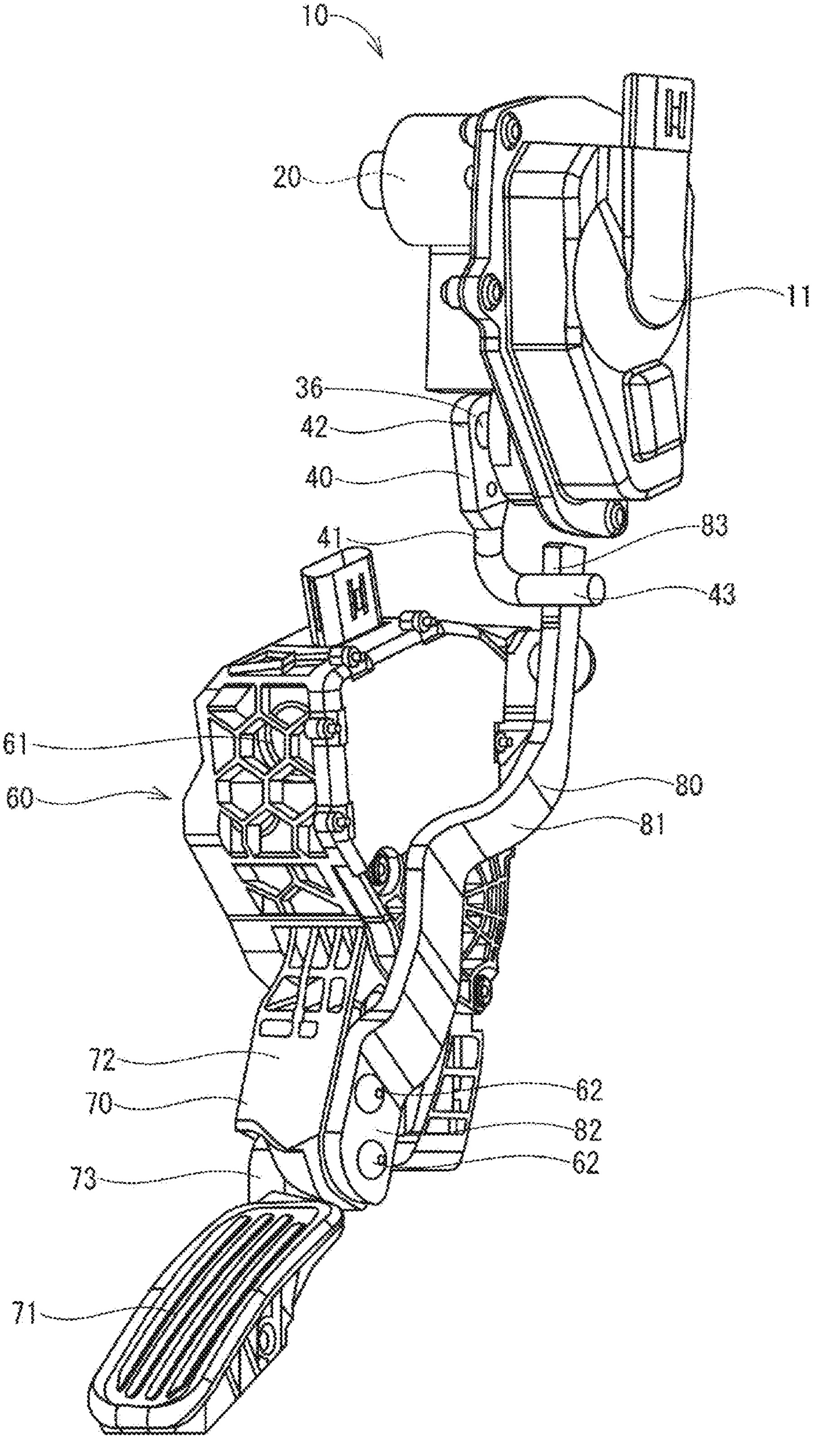
FIG. 2 is a perspective view showing the accelerator device and the reaction force application device applied together with the accelerator device according to the first embodiment.
Figure 3:
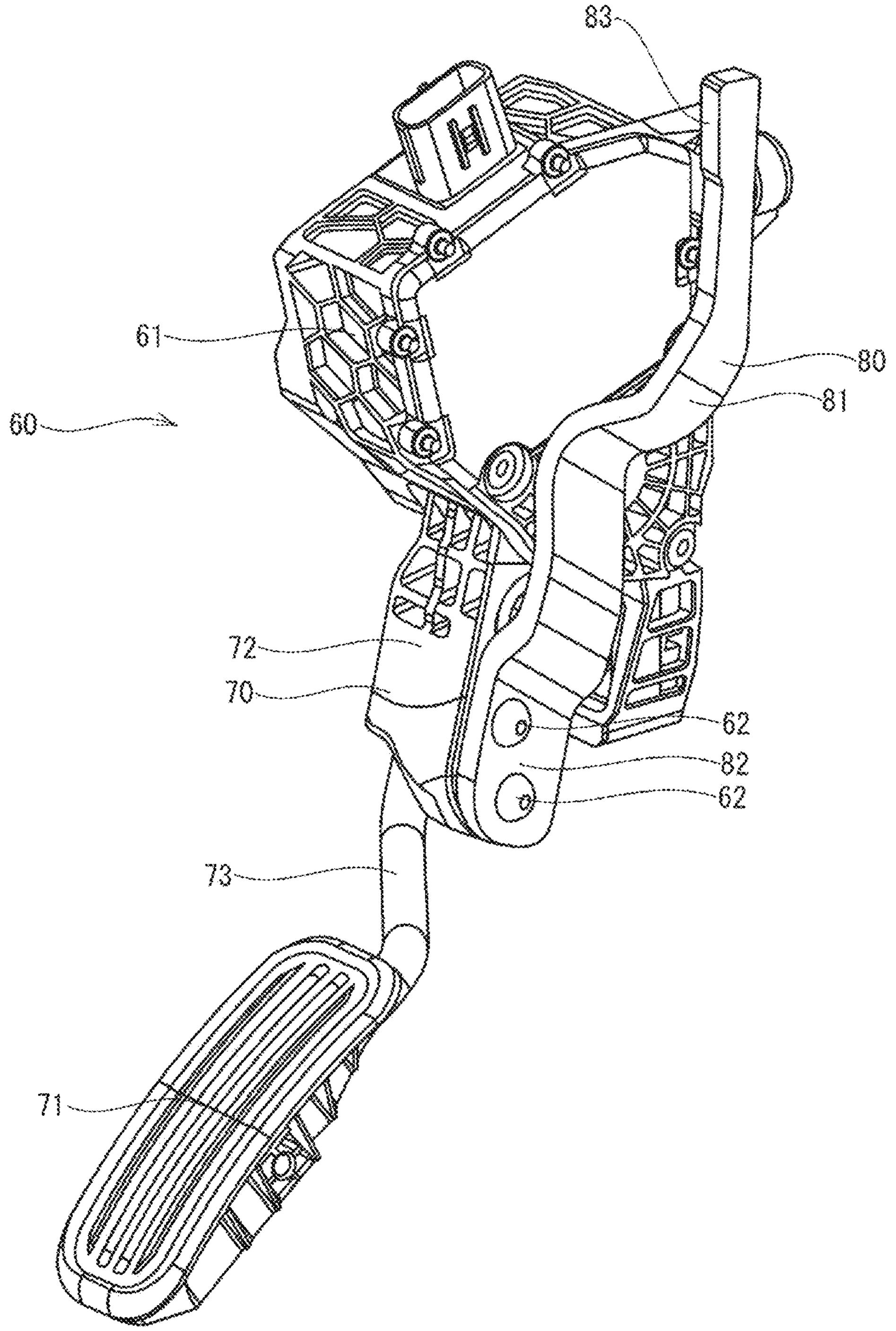
FIG. 3 is a perspective view showing the accelerator device according to the first embodiment.

FIGS. 1 and 2 show an accelerator device and a reaction force application device applied together with the accelerator device according to the first embodiment.

The accelerator device 60 is installed on a vehicle (automobile) 1 to detect an accelerator opening degree corresponding to a rotational angle of a pedal 70 operated by a human driver (hereinafter referred to as a driver) of the vehicle and control a driving state of the vehicle 1. The accelerator device 60 adopts an accelerator-by-wire system (also known as a drive-by-wire system) and is not mechanically connected to a throttle device of the vehicle 1. The accelerator device 60 transmits information regarding the accelerator opening degree corresponding to the rotational angle of the pedal 70 to an electronic control unit (hereinafter referred to as ECU) not shown in the drawing. The ECU controls the throttle device based on the accelerator opening degree transmitted from the accelerator device 60. As a result, the driving state of the vehicle 1 is controlled.

The reaction force application device 10 is installed on the vehicle 1 together with the accelerator device 60 and is configured to apply the reaction force F2 against the pedal force F1 of the driver to the pedal 70 of the accelerator device 60. The reaction force application device 10 is configured to provide a driver notification(s), such as a danger alert notification(s) and a fuel efficiency improvement notification(s), by applying the reaction force to the pedal 70 of the accelerator device 60. The reaction force application device 10 can also be configured to restrict the rotation of the pedal 70, thereby converting it into a footrest.

In FIG. 1, an x-axis indicates a traveling direction of the vehicle 1, and a y-axis indicates a vehicle width direction. Furthermore, a z-axis indicates a vertical upward direction. Hereinafter, unless otherwise specified, the shapes or configurations of the accelerator device 60 and the reaction force application device 10 in the installed state thereof on the vehicle 1 will be described. For example, "upper" or "upper side" means the upper or upper side in the state where the accelerator device 60 or the reaction force application device 10 is installed on the vehicle 1. In the present embodiment, a floor panel 2 has a wall surface 7 that is parallel to a y-z plane.

As shown in FIGS. 1 to 4, the accelerator device 60 includes the pedal 70, an arm 80, a plurality of fastener members 62 and a positioner 90. The pedal 70 is configured to be depressed by the driver. The arm 80 is coupled to the pedal 70 and is configured to receive the reaction force from the reaction force application device 10. The reaction force application device 10 is configured to apply the reaction force to the arm 80 against the pedal force applied from the driver to the pedal 70.

The fastener members 62 are configured to fix the arm 80 to the pedal 70. The positioner 90 is configured to limit relative movement between the arm 80 and the pedal 70. The arm 80 has: a connector 82 that is coupled with the pedal 70; and a plurality of through-holes 84 that are formed at the connector 82 and respectively receive the fastener members 62 through the through-holes 84.

The positioner 90 includes two positioning planar portions 91 which are parallel to each other and are configured to engage with another member.

More specifically, the accelerator device 60 includes a pedal housing 61. The pedal housing 61 is installed on the floor panel 2 of the vehicle 1 by being fixed to the wall surface 7 of the floor panel 2 with mounting bolts (not shown), for example.

The pedal 70 is rotatably supported by the pedal housing 61 so as to rotate around a rotational axis Ax1. The pedal 70 has a pad 71 that is configured to be depressed by the driver. An accelerator opening degree sensor (not shown) is installed on the rotational axis Ax1 at the inside of the pedal housing 61. The accelerator opening degree sensor detects the accelerator opening degree corresponding to the rotational angle of the pedal 70 rotated by the depressing operation of the driver and transmits the detected opening degree to the ECU. The rotational axis Ax1 is set to be perpendicular to the z-axis and the x-axis, and parallel to the y-axis.

A pedal urging member (not shown) is installed at the inside of the pedal housing 61. The pedal 70 is urged in an accelerator closing direction by the pedal urging member. The pedal housing 61 has: one stopper that limits the rotation of the pedal 70 in the accelerator closing direction; and another stopper that limits the rotation of the pedal 70 in the accelerator opening direction. The pedal 70 is rotatable within a range which is from a contact position, where the pedal 70 contacts the one stopper, to another contact position, where the pedal 70 contacts the other stopper. FIG. 1 shows a state where the pedal 70 is in contact with the one stopper in the accelerator closing direction, i.e., is in an accelerator fully closed state.

The pedal 70 has the pad 71, a pedal base 72 and a pedal connector 73. The pedal connector 73 is made of, for example, metal and connects between the pad 71 and the pedal base 72, with one end of the pedal connector 73 connected to the pad 71 and the other end connected to the pedal base 72. The pedal base 72 is rotatably supported by the pedal housing 61 so as to rotate around the rotational axis Ax1. Therefore, the pedal 70 is rotatable about the rotational axis Ax1.

The arm 80 is shaped in an elongated plate form and is installed to the pedal 70 such that the connector 82, which is one end portion of the arm 80, is coupled to the pedal base 72. Therefore, the arm 80 is rotatable integrally with the pedal 70 about the rotational axis Ax1.

As shown in FIGS. 1 and 2, the reaction force application device 10 includes an actuator 20 and a lever 40. The actuator 20 generates a drive force when the actuator 20 is energized. The lever 40 can be rotated by the drive force outputted from the actuator 20 and apply the reaction force to the pedal 70 against the pedal force of the driver.

More specifically, the reaction force application device 10 includes an actuator housing 11. The actuator housing 11 is fixed to a pedestal 9 installed on the wall surface 7 of the floor panel 2 of the vehicle 1 by a plurality of mounting bolts (not shown) and is thereby attached to the floor panel 2 through the pedestal 9.

The actuator 20 is, for example, an electric motor and is received in the actuator housing 11. The actuator 20 can output torque as the drive force when the actuator 20 is energized. The ECU can control the energization of the actuator 20 and thereby control the operation of the actuator 20. The actuator housing 11 receives a speed reducer that includes a plurality of gears (not shown). The speed reducer can reduce a rotational speed of the rotation outputted from the actuator 20 and output the torque of the rotation from a shaft member 36. The shaft member 36 is installed on the rotational axis Ax2 and is rotatably supported by the actuator housing 11 around the rotational axis Ax2.

The lever 40 has a lever main body 41, a one-side lever end portion 42 and an other-side lever end portion 43. The lever main body 41 is made of, for example, metal and is shaped in a rod form. The one-side lever end portion 42 is joined to one end of the lever main body 41 and is formed integrally with the lever main body 41 in one-piece. The other-side lever end portion 43 is joined to the other end of the lever main body 41 and is formed integrally with the lever main body 41 in one-piece. The other-side lever end portion 43 is formed to be approximately perpendicular to the lever main body 41. The other-side lever end portion 43 extends in parallel with the y-axis.

The lever 40 is arranged such that the one-side lever end portion 42 is joined to the shaft member 36. As a result, the lever 40 is rotatably supported by the actuator housing 11 such that the lever 40 is rotatable around the rotational axis Ax2 together with the shaft member 36. The lever 40 is rotated around the rotational axis Ax2 by the drive force outputted from the actuator 20 through the shaft member 36.

As shown in FIG. 1, the reaction force application device 10 is arranged such that an outer peripheral wall of the other-side lever end portion 43 can be brought into contact with a surface of the arm 80 of the accelerator device 60 opposite to the floor panel 2 and can be separated from the surface of the arm 80 opposite to the floor panel 2. Therefore, the reaction force application device 10 can apply the reaction force F2 to the pedal 70 against the pedal force F1 of the driver through the arm 80 from the lever 40 which is rotated by the drive force outputted from the actuator 20.

Next, details of the structure of the accelerator device 60 will be described.

Figure 4:
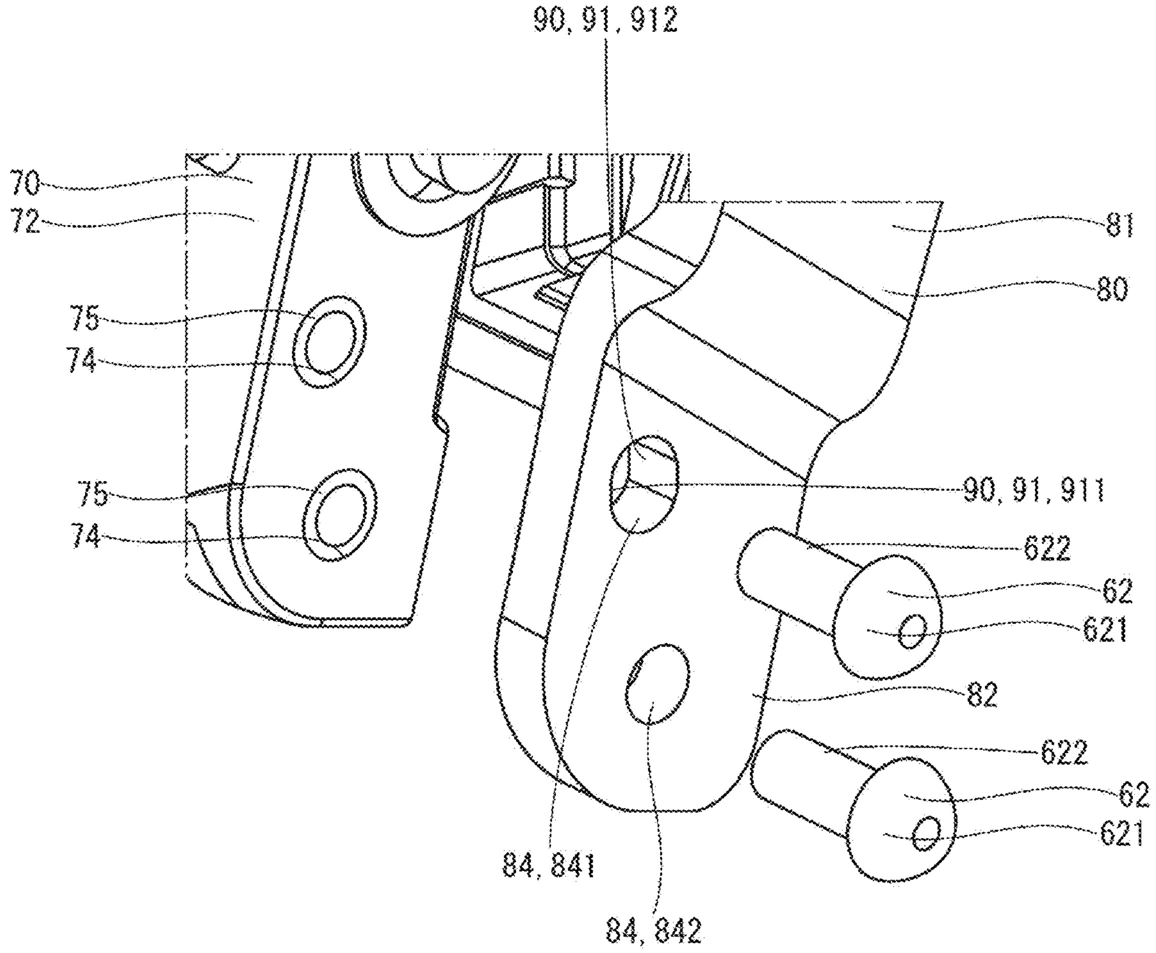
FIG. 4 is a perspective view showing a portion of the accelerator device according to the first embodiment.

As shown in FIG. 4, the pedal 70 has a plurality of pedal holes 74 and a plurality of nuts 75. The pedal base 72 is made of, for example, resin. The number of the pedal holes 74 is two, and these two pedal holes 74 are formed as holes, respectively, recessed from an outer wall of the pedal base 72. Each nut 75 is, for example, formed in a cylindrical form from metal and a thread groove is formed on an inner peripheral wall of the nut 75. Each nut 75 is, for example, thermally press-fitted into a corresponding one of the two pedal holes 74. Here, the nus 75 are members that form part of the pedal 70.

The arm 80 has an arm main body 81, the connector 82, a reaction force receiving contact surface 83 and the through-holes 84. The arm main body 81 is formed by bending an elongated plate-shaped member made of, for example, metal at predetermined locations (see FIGS. 2 and 3). The connector 82 is formed at one end portion of the arm main body 81. The reaction force receiving contact surface 83 is formed in a planar shape on a side surface of the other end portion of the arm main body 81 extending in a plate surface direction (see FIGS. 1 to 3 and 5).

The number of the through-holes 84 is two, and these two through-holes 84 are formed at the connector 82. Each through-hole 84 extends through the connector 82 in a plate thickness direction of the connector 82. One of the two through-holes 84 is referred to as a through-hole 841, and this through-hole 841 is formed as an elongated hole (see FIG. 5). The other one of the two through-holes 84 is referred to as a through-hole 842, and this through-hole 842 is shaped in a cylindrical form.

Each fastener member 62 is, for example, a so-called screw made of metal. The fastener member 62 has a head portion 621 and a shaft portion 622 (see FIG. 4). The head portion 621 is shaped generally in a circular plate form. The shaft portion 622 extends from a center of the head portion 621 in the axial direction. A thread ridge, which can engage with the thread groove of the nut 75, is formed on an outer peripheral wall of the shaft portion 622.

In the present embodiment, the number of the fastener members 62 is two. One of the two fastener members 62 is formed to pass through the through-hole 841 and engage with one of the two nuts 75. The other one of the two fastener members 62 is formed to pass through the through-hole 842 and engage with the other one of the two nuts 75.

The fastener members 62 can fix the arm 80 to the pedal 70 by clamping the connector 82 between the head portions 621 and the nuts 75. The connector 82 is coupled to the nuts 75 which are part of the pedal 70.

The two positioning planar portions 91 are formed at the through-hole 841.

Figure 5:
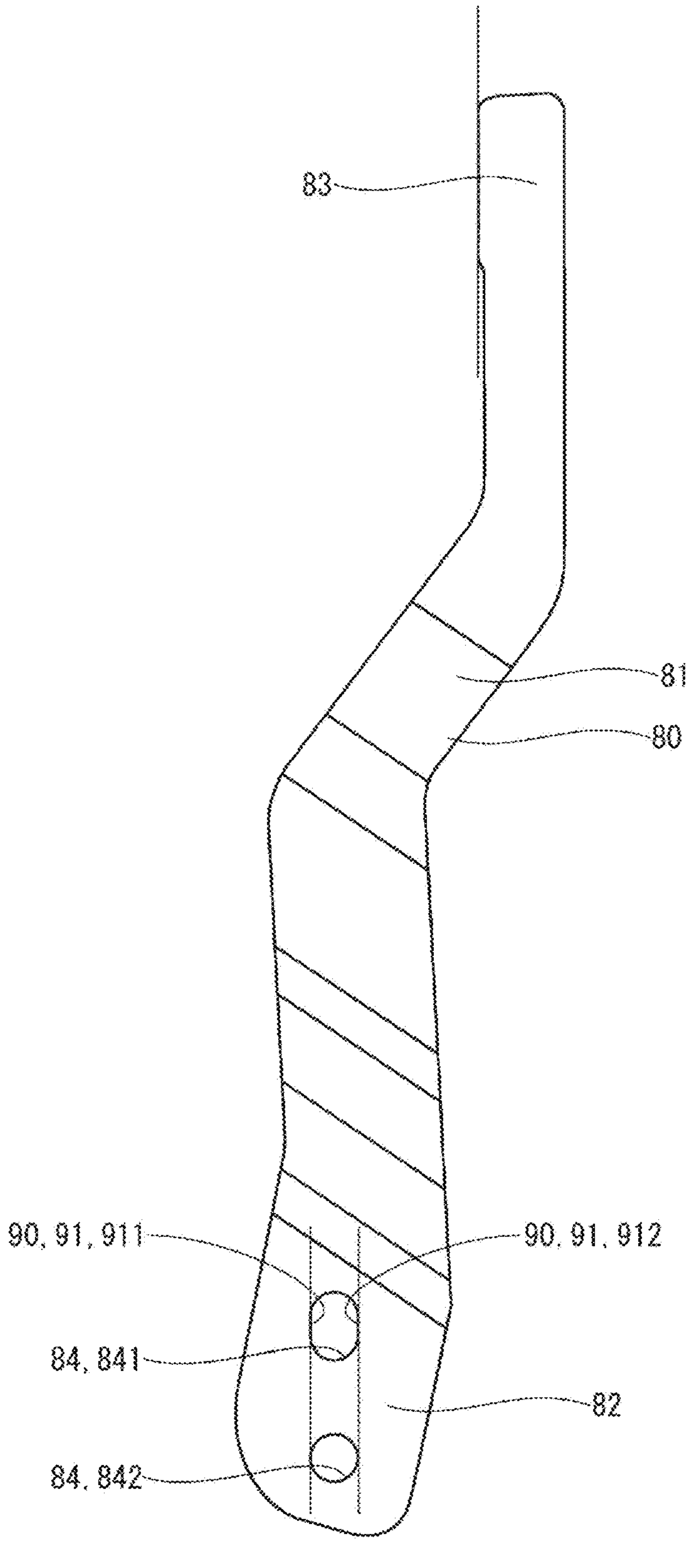
FIG. 5 is a diagram showing an arm of the accelerator device according to the first embodiment.
Figure 6:
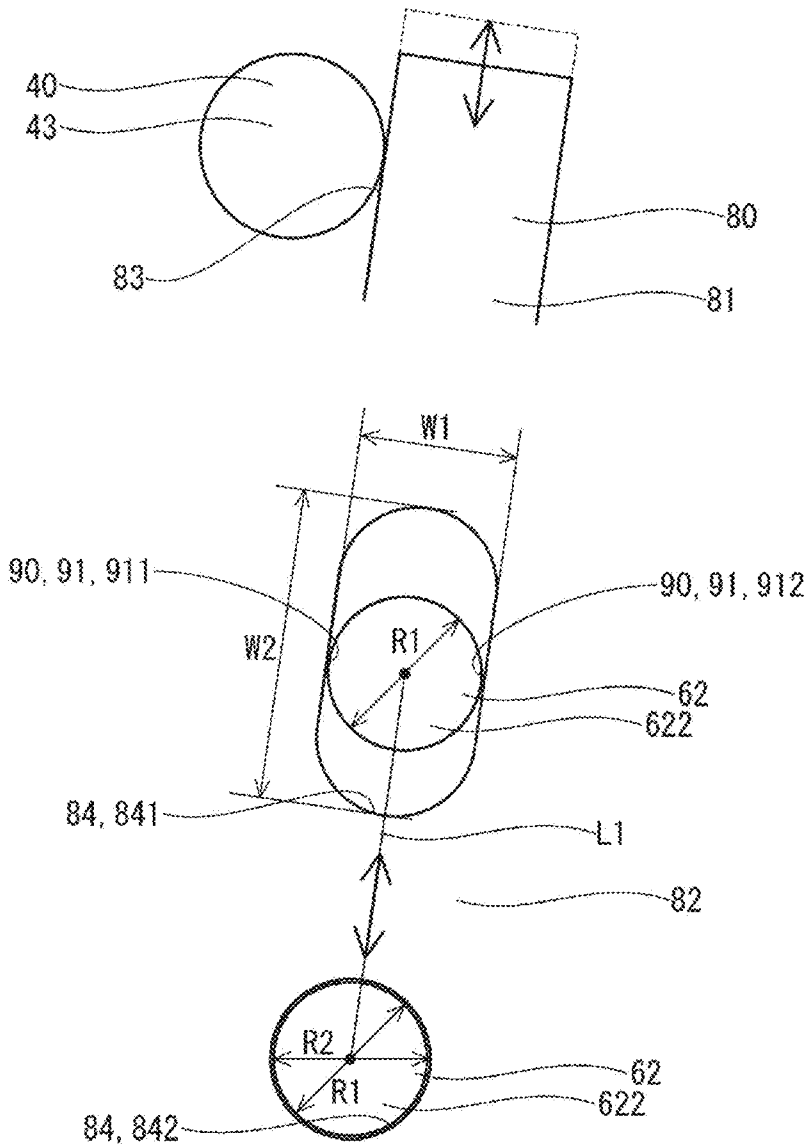
FIG. 6 is a schematic diagram showing a portion of the accelerator device for explaining advantages of the accelerator device of the first embodiment.

The two positioning planar portions 91 are formed at an inner wall of the through-hole 841 (see FIGS. 5 and 6). One of the two positioning planar portions 91 is referred to as a positioning planar portion 911, and the positioning planar portion 911 is formed on one of two planar inner wall sections of the through-hole 841 which are opposed to each other. The other one of the two positioning planar portions 91 is referred to as a positioning planar portion 912, and the positioning planar portion 912 is formed on the other one of the two planar inner wall sections of the through-hole 841 which are opposed to each other. The positioning planar portion 911 and the positioning planar portion 912 are parallel to each other.

The positioning planar portion 911 and the positioning planar portion 912 are parallel to a straight line L1 that connects between centers of the two fastener members 62 (see FIG. 6).

As shown in FIG. 6, it is assumed that: an outer diameter of the shaft portion 622 of the fastener member 62 is R1; an inner diameter of the through-hole 842 is R2; a width of the through-hole 841 in a transverse direction perpendicular to a longitudinal direction of the through-hole 841 is W1; and a width of the through-hole 841 in the longitudinal direction is W2. Under this assumption, the fastener member 62 and the through-hole 842 are formed to satisfy a relationship of, for example, 1.001<R2/R1<1.1. Furthermore, the fastener member 62 and the through-hole 841 are also formed to satisfy relationships of, for example, 1.001<W1/R1<1.1 and 1.01<W2/R1. In the above relationships, there is satisfied: R2=W1. Furthermore, the width W1 is equal to a distance between the positioning planar portion 911 and the positioning planar portion 912.

The width W2 is set to a size that allows the shaft portion 622 to move relatively in the longitudinal direction within the through-hole 841.

The positioning planar portion 911 and the positioning planar portion 912 are parallel surfaces that are parallel to each other and are configured to engage with the fastener member 62 which serves as another member.

In the present embodiment, at the time of assembling the arm 80 to the pedal 70, the shaft portions 622 of the two fastener members 62 are inserted into the through-hole 841 and the through-hole 842, respectively, and a part of each shaft portion 622 is screwed into the corresponding nut 75. In this state, relative movement between the arm 80 and the pedal 70 in a direction perpendicular to a plane of the positioning planar portion 91 is limited, and relative movement between the arm 80 and the pedal 70 in a direction parallel to the plane of the positioning planar portion 91 is enabled to allow adjustment of an assembling position of the arm 80 relative to the pedal 70.

The reaction force receiving contact surface 83 is configured to contact the lever 40 of the reaction force application device 10 and receive the reaction force from the lever 40 against the pedal force of the driver. More specifically, the reaction force receiving contact surface 83 is configured to contact the outer peripheral wall of the other-side lever end portion 43 of the lever 40.

The positioning planar portion 911 and the positioning planar portion 912 are parallel to the reaction force receiving contact surface 83 (see FIGS. 5 and 6).

Therefore, at the time of assembling the arm 80 to the pedal 70, even when the assembling position of the arm 80 relative to the pedal 70 deviates in the direction parallel to the plane of the positioning planar portion 91, it is possible to limit variations in the relative position between the other-side lever end portion 43 and the reaction force receiving contact surface 83.

As described above, in the present embodiment, the fastener members 62 can fix the arm 80 to the pedal 70. The positioner 90 is configured to limit relative movement between the arm 80 and the pedal 70. The arm 80 has: the connector 82 that is coupled with the pedal 70; and the plurality of through-holes 84 that are formed at the connector 82 and receive the fastener members 62 through the through-holes 84.

The positioner 90 includes the two positioning planar portions 91 which are parallel to each other and are configured to engage with the fastener member 62 serving as the another member. Therefore, by engaging the two positioning planar portions 91 with the fastener member 62, it is possible to allow the relative movement between the arm 80 and the pedal 70 in the direction parallel to the plane of the positioning planar portion 91, while limiting the relative movement between the arm 80 and the pedal 70 in the direction perpendicular to the plane of the positioning planar portion 91. Thus, the assemblability is ensured by allowing the relative movement between the arm 80 and the pedal 70 in the direction parallel to the plane of the positioning planar portion 91, and the variations in the assembling position are limited by limiting the relative movement between the arm 80 and the pedal 70 in the direction perpendicular to the plane of the positioning planar portion 91. Therefore, it is possible to achieve both the assemblability of the members and the reduction of the variations in the assembling position of the members. Thus, it is possible to limit the variations in the reaction force applied to the arm 80 from the reaction force application device 10.

In the present embodiment, the positioning planar portion 911 and the positioning planar portion 912 are parallel to the straight line L1 that connects between the centers of the two fastener members 62.

Therefore, the fastener member 62 can be used as the another member that is an engaging subject to be engaged with the positioning planar portions 91. This reduces the number of components compared to a case where another different member engaging with the positioning planar portions 91 is separately provided.

Furthermore, in the present embodiment, the reaction force receiving contact surface 83 is configured to contact the lever 40 of the reaction force application device 10 and receive the reaction force from the lever 40 against the pedal force of the driver. The positioning planar portions 91 are parallel to the reaction force receiving contact surface 83.

Therefore, at the time of assembling the arm 80 to the pedal 70, even when the assembling position of the arm 80 relative to the pedal 70 deviates in the direction parallel to the plane of the positioning planar portion 91, it is possible to limit variations in the relative position between the other-side lever end portion 43 and the reaction force receiving contact surface 83. Therefore, it is possible to limit the variations in the reaction force applied to the arm 80 from the reaction force application device 10.

Furthermore, in the present embodiment, the two positioning planar portions 91 are formed at the through-hole 841.

Therefore, the fastener member 62 can be used as the another member that is the engaging subject to be engaged with the positioning planar portions 91.

Second Embodiment

Figure 7:
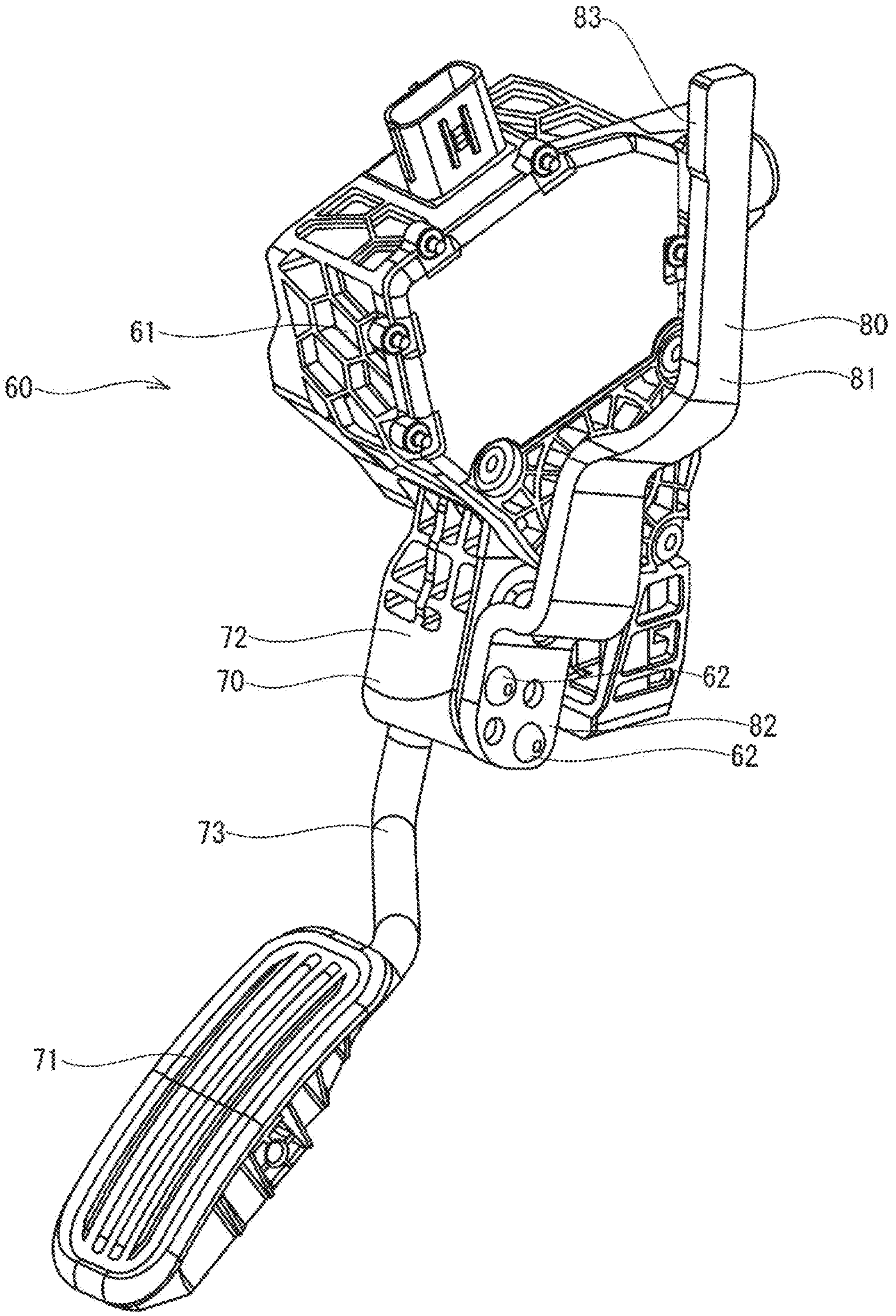
FIG. 7 is a perspective view showing an accelerator device according to a second embodiment.
Figure 8:
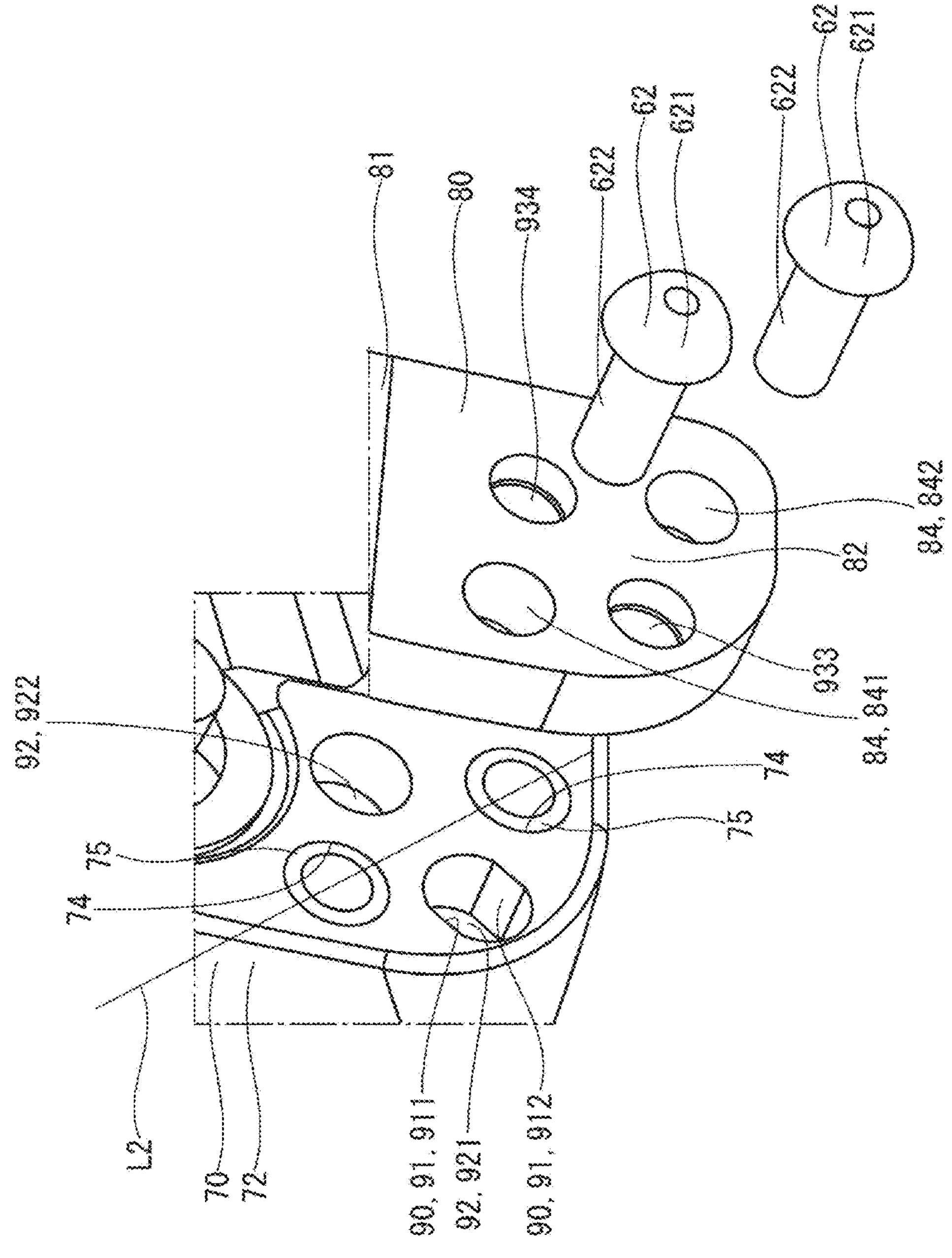
FIG. 8 is a perspective view showing a portion of the accelerator device according to the second embodiment.
Figure 9:
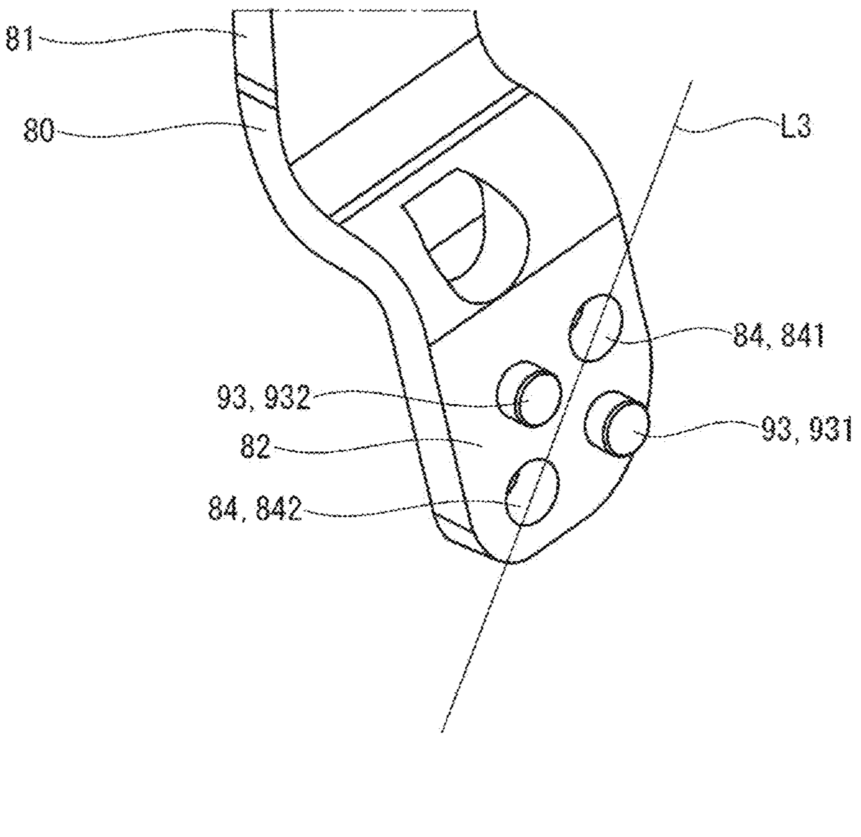
FIG. 9 is a perspective view showing a portion of an arm of the accelerator device according to the second embodiment.

FIGS. 7 to 9 show an accelerator device and part of the accelerator device according to the second embodiment. The second embodiment differs from the first embodiment with respect to the structures of the pedal 70 and the arm 80.

In the present embodiment, the positioner 90 includes: a plurality of positioning recesses 92 which are formed at the pedal 70; and a plurality of positioning projections 93 which are formed at the connector 82 and are configured to be inserted into the positioning recesses 92, respectively. The two positioning planar portions 91 are formed at one of the positioning recesses 92.

More specifically, the number of the positioning recesses 92 is two, and these two positioning recesses 92 are formed at the pedal base 72. One of the two positioning recesses 92 is referred to as a positioning recess 921. The positioning recess 921 is formed as a hole recessed from the outer wall of the pedal base 72 on one side of a straight line L2, which passes through the centers of the two pedal holes 74, in a direction perpendicular to the straight line L2 (see FIG. 8). The other one of the two positioning recesses 92 is referred to as a positioning recess 922. The positioning recess 922 is formed as a hole recessed from the outer wall of the pedal base 72 on the other side of the straight line L2, which passes through the centers of the two pedal holes 74, in the direction perpendicular to the straight line L2.

The positioning recess 921 is formed as an elongated hole. The positioning recess 922 is shaped in a cylindrical form.

Two positioning planar portions 91 are formed at an inner wall of the positioning recess 921 (see FIG. 8). The positioning planar portion 911, which is the one of the two positioning planar portions 91, is formed on one of two planar inner wall sections of the positioning recess 921 which are opposed to each other. The positioning planar portion 912, which is the other one of the two positioning planar portions 91, is formed on the other one of the two planar inner wall sections of the positioning recess 921 which are opposed to each other. The positioning planar portion 911 and the positioning planar portion 912 are parallel to each other.

The number of the positioning projections 93 is two, and these two positioning projections 93 are formed at the connector 82 (see FIG. 9). One of the two positioning projections 93 is referred to as a positioning projection 931. The positioning projection 931 is formed as a cylindrical projection projected from an end surface of the connector 82 on one side of a straight line L3, which passes through the centers of the through-hole 841 and the through-hole 842, in a direction perpendicular to the straight line L3. The other one of the two positioning projections 93 is referred to as a positioning projection 932. The positioning projection 932 is formed as a cylindrical projection projected from the end surface of the connector 82 on the other side of the straight line L3 in the direction perpendicular to the straight line L3.

In addition, at an opposite end surface of the connector 82, which is opposite to the positioning projections 93, a recess 933 and a recess 934 are formed. The recess 933 and the recess 934 are formed at two locations which correspond to the positioning projection 931 and the positioning projection 932, respectively. The recess 933 and the recess 934 are recessed to correspond to the shapes of the positioning projection 931 and the positioning projection 932 (see FIG. 8).

The positioning projection 931 and the positioning projection 932 are configured to be inserted into the positioning recess 921 and the positioning recess 922, respectively. Here, the positioning planar portion 911 and the positioning planar portion 912 are configured to engage with an outer peripheral wall of the positioning projection 931 which serves as another member and is formed on the arm 80.

In the present embodiment, the through-hole 841 is shaped in a cylindrical form. The positioning planar portion 911 and the positioning planar portion 912 are not parallel to the reaction force receiving contact surface 83.

In the present embodiment, at the time of assembling the arm 80 to the pedal 70, the positioning projection 931 and the positioning projection 932 are inserted into the positioning recess 921 and the positioning recess 922, respectively. In this state, relative movement between the arm 80 and the pedal 70 in the direction perpendicular to the plane of the positioning planar portion 91 is limited, and relative movement between the arm 80 and the pedal 70 in the direction parallel to the plane of the positioning planar portion 91 is enabled to allow adjustment of the assembling position of the arm 80 relative to the pedal 70.

As described above, in the present embodiment, the positioner 90 includes: the positioning recesses 92 which are formed at the pedal 70; and the positioning projections 93 which are formed at the connector 82 and are configured to be inserted into the positioning recesses 92, respectively. The two positioning planar portions 91 are formed at the one of the positioning recesses 92.

Therefore, the positioner 90 can limit the relative movement between the arm 80 and the pedal 70, and the fastener members 62 can fix the arm 80 to the pedal 70.

Third Embodiment

Figure 10:
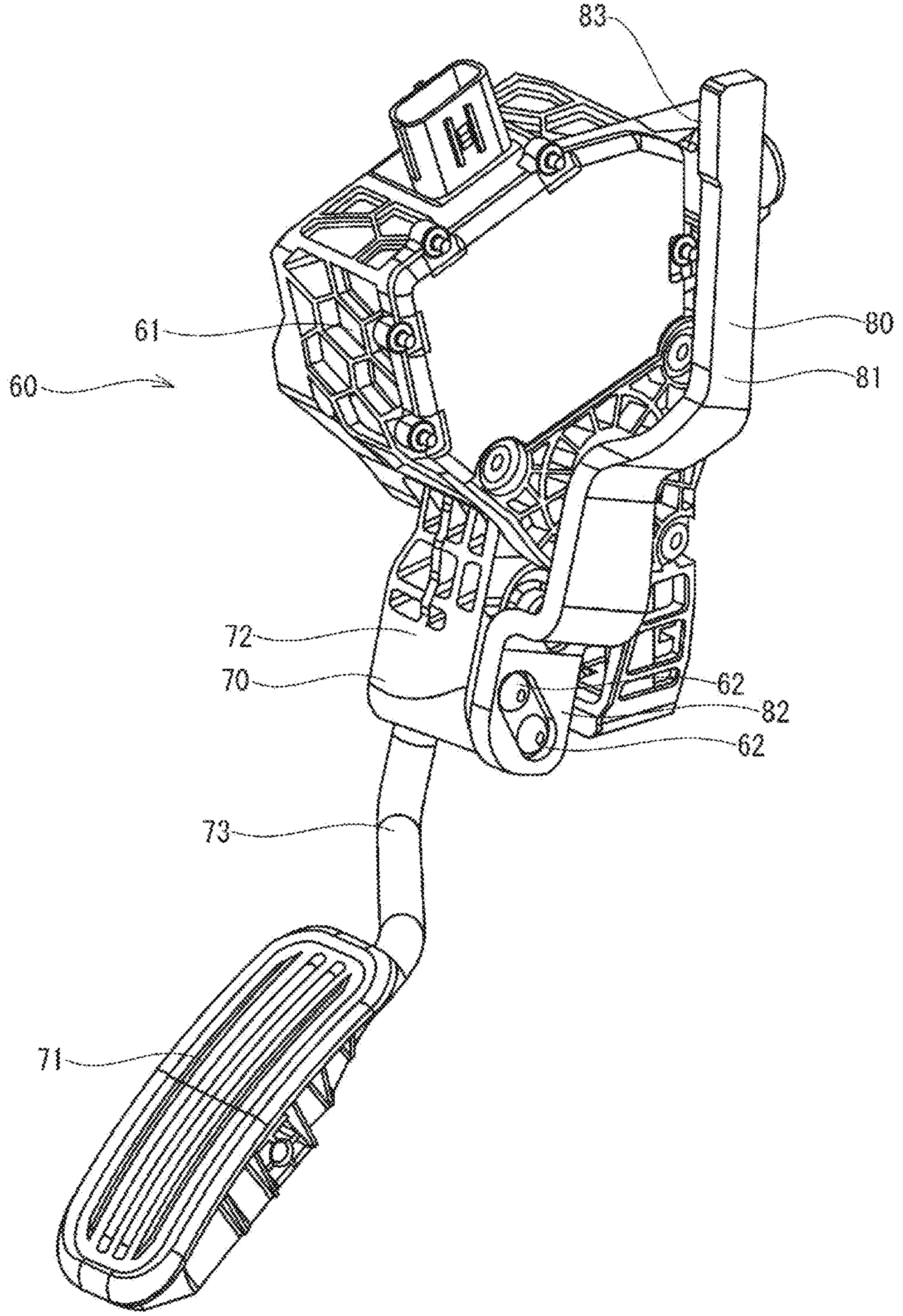
FIG. 10 is a perspective view showing an accelerator device according to a third embodiment.
Figure 11:
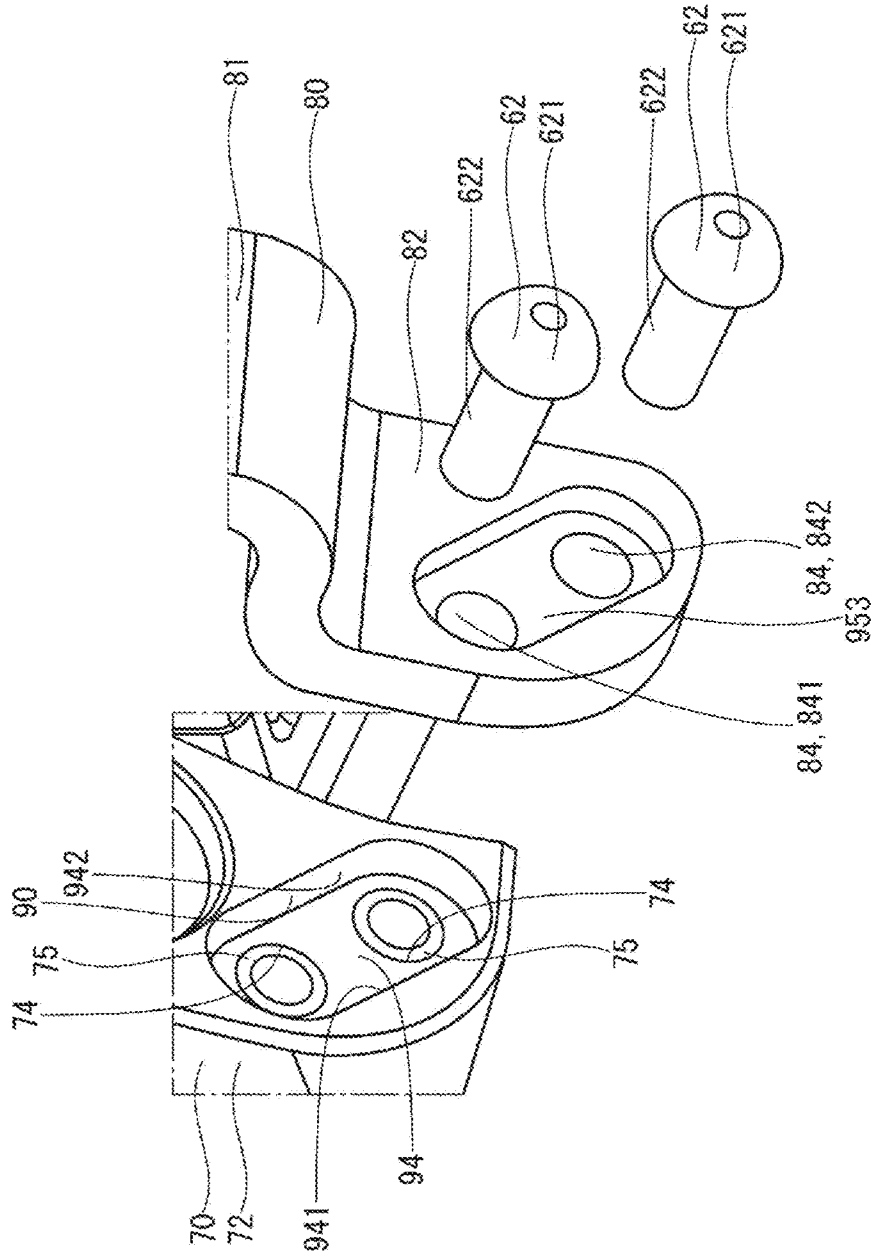
FIG. 11 is a perspective view showing a portion of the accelerator device according to the third embodiment.
Figure 12:
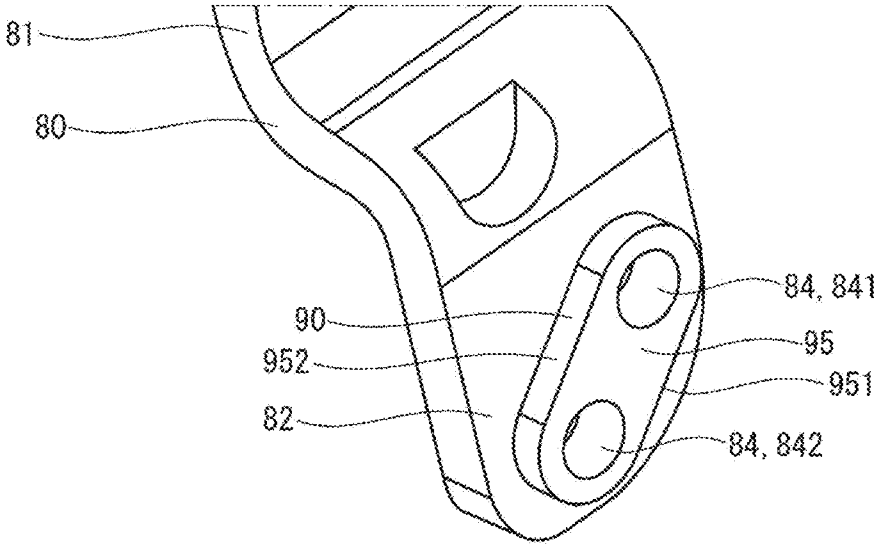
FIG. 12 is a perspective view showing a portion of an arm of the accelerator device according to the third embodiment.

FIGS. 10 to 12 show an accelerator device and part of the accelerator device according to the third embodiment. The third embodiment differs from the first embodiment with respect to the structures of the pedal 70 and the arm 80.

In the present embodiment, the positioner 90 includes: a positioning recess 94 which is formed at the pedal 70; and a positioning projection 95 which is formed at the connector 82 and is configured to be inserted into the positioning recess 94. A positioning planar portion 941 and a positioning planar portion 942 are formed at the positioning recess 94. A positioning planar portion 951 and a positioning planar portion 952 are formed at the positioning projection 95.

More specifically, there is only one positioning recess 94 formed at the pedal base 72. The positioning recess 94 is recessed as a hole recessed from the outer wall of the pedal base 72. The positioning recess 94 is formed as an elongated hole.

The positioning planar portion 941 is formed on one of two planar inner wall sections of the positioning recess 94 which are opposed to each other. The positioning planar portion 942 is formed on the other one of the two planar inner wall sections of the positioning recess 94 which are opposed to each other. The positioning planar portion 941 and the positioning planar portion 942 are parallel to each other.

The two pedal holes 74 are formed at a bottom surface of the positioning recess 94. The nuts 75 are installed into the pedal holes 74, respectively.

There is only one positioning projection 95 formed at the connector 82 (see FIG. 12). The positioning projection 95 is formed to project from the end surface of the connector 82. A cross-section of the positioning projection 95, which is perpendicular to a projecting direction of the positioning projection 95, is shaped in an oval form (oval track form) to correspond with a shape of a cross section of the positioning recess 94, which is perpendicular to a recessing direction of the positioning recess 94.

The positioning planar portion 951 is formed on one of two planar outer wall sections of the positioning projection 95 which are opposed to each other. The positioning planar portion 952 is formed on the other one of the two planar outer wall sections of the positioning projection 95 which are opposed to each other.

In addition, at the opposite end surface of the connector 82, which is opposite to the positioning projection 95, a recess 953 is formed. The recess 953 is formed at a location which corresponds to the positioning projection 95. The recess 953 is recessed to correspond to the shape of the positioning projection 95.

The through-hole 841 and the through-hole 842 are formed to connect between a bottom surface of the recess 953 and an end surface of the positioning projection 95.

The positioning projection 95 is configured to be inserted into the positioning recess 94. Here, the positioning planar portion 941 and the positioning planar portion 951 are configured to oppose each other and contact each other. Furthermore, the positioning planar portion 942 and the positioning planar portion 952 are configured to oppose each other and contact each other. That is, the positioning planar portion 941 and the positioning planar portion 942 are configured to engage with the positioning planar portion 951 and the positioning planar portion 952 which are formed at the arm 80 serving as the another member.

A width of the positioning recess 94 in a longitudinal direction of the positioning recess 94 is larger than a width of the positioning projection 95 in a longitudinal direction of the positioning projection 95. Therefore, the positioning projection 95 is configured to move relative to the positioning recess 94 in a direction parallel to the positioning planar portion 941 and the positioning planar portion 942.

In the present embodiment, the through-hole 841 is shaped in the cylindrical form. The positioning planar portion 941, the positioning planar portion 942, the positioning planar portion 951 and the positioning planar portion 952 are not parallel to the reaction force receiving contact surface 83.

In the present embodiment, at the time of assembling the arm 80 to the pedal 70, the positioning projection 95 is inserted into the positioning recess 94. In this state, relative movement between the arm 80 and the pedal 70 in a direction perpendicular to the positioning planar portion 941, the positioning planar portion 942, the positioning planar portion 951 and the positioning planar portion 952 is limited, and relative movement between the arm 80 and the pedal 70 in a direction parallel to the positioning planar portion 941, the positioning planar portion 942, the positioning planar portion 951 and the positioning planar portion 952 is enabled to allow adjustment of the assembling position of the arm 80 relative to the pedal 70.

As described above, in the present embodiment, the positioner 90 includes: the positioning recess 94 which is formed at the pedal 70; and the positioning projection 95 which is formed at the connector 82 and is configured to be inserted into the positioning recess 94. The positioning planar portion 941 and the positioning planar portion 942 are formed at the positioning recess 94. The positioning planar portion 951 and the positioning planar portion 952 are formed at the positioning projection 95.

Therefore, the positioner 90 can limit the relative movement between the arm 80 and the pedal 70, and the fastener members 62 can fix the arm 80 to the pedal 70.

Fourth Embodiment

Figure 13:
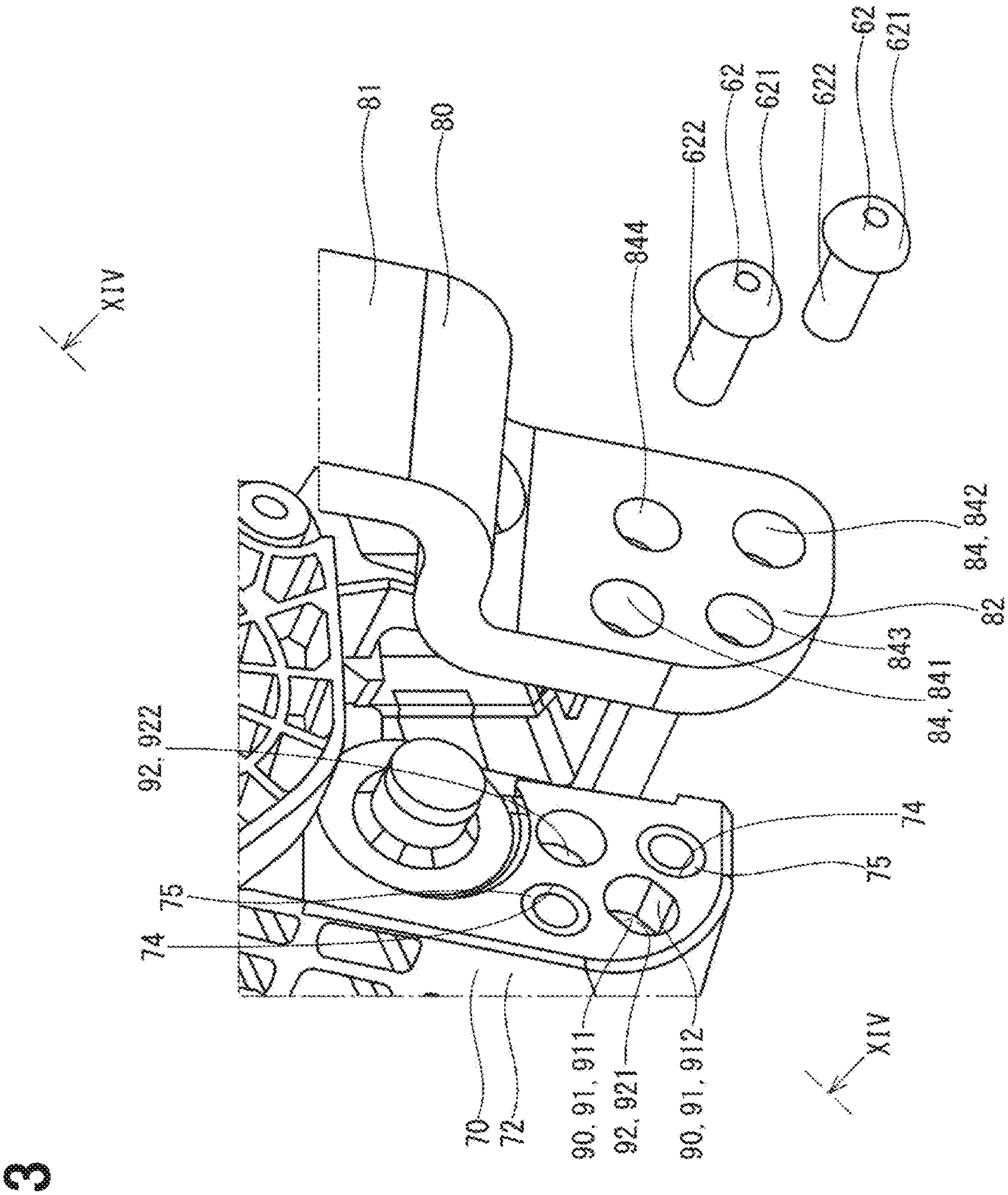
FIG. 13 is a perspective view showing a portion of an accelerator device according to a fourth embodiment.
Figure 14:
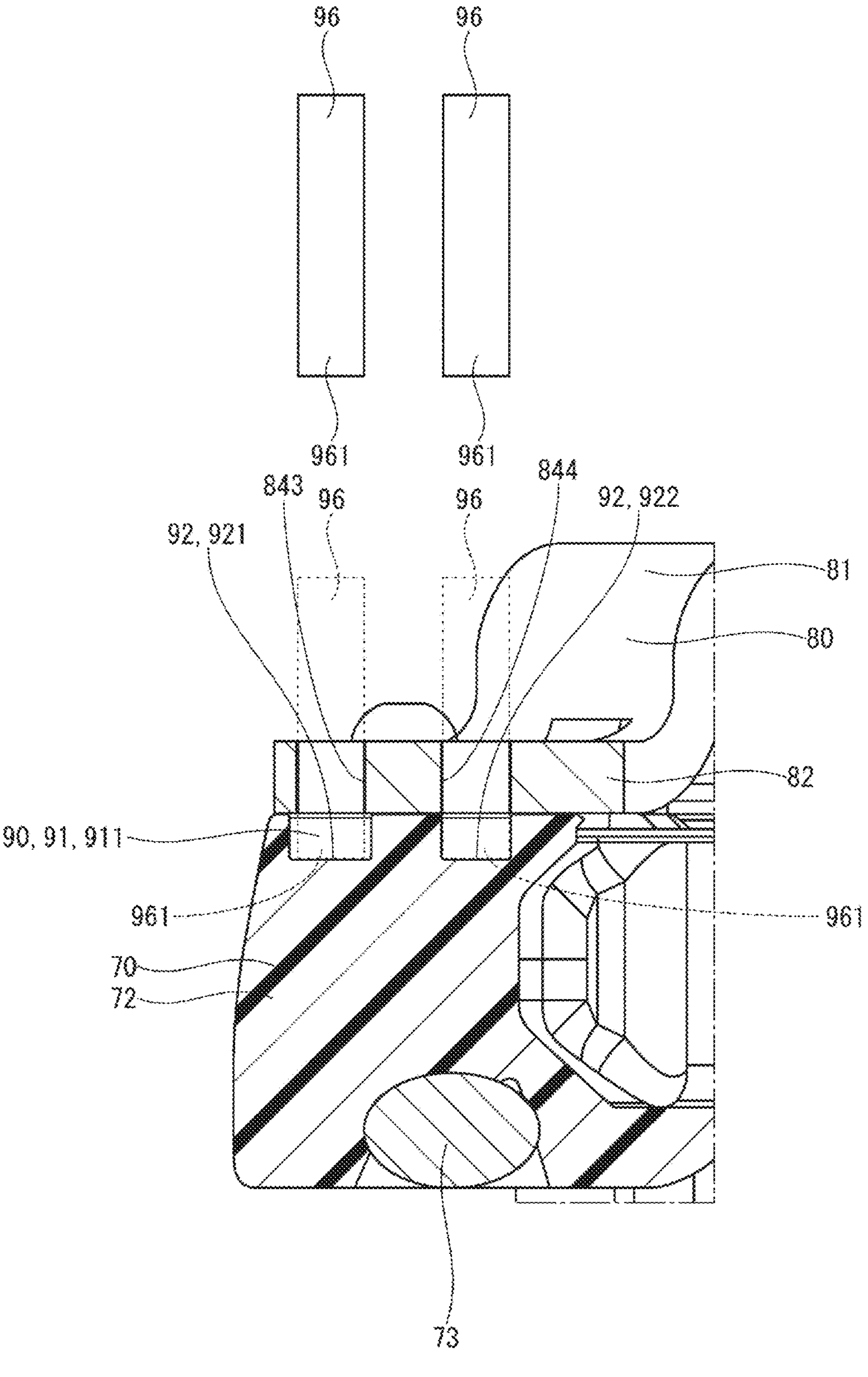
FIG. 14 is a cross-sectional view showing a portion of the accelerator device according to the fourth embodiment.

FIGS. 13 and 14 show part of an accelerator device according to the fourth embodiment. The fourth embodiment differs from the second embodiment with respect to the structure of the arm 80.

In the present embodiment, a through-hole 843 and a through-hole 844 are formed at corresponding positions, respectively, of the connector 82 where the positioning projection 931, the positioning projection 932, the recess 933 and the recess 934 are formed in the second embodiment. Each of the through-hole 843 and the through-hole 844 is shaped in a cylindrical form and extends through the connector 82 in the plate thickness direction of the connector 82.

In the present embodiment, at the time of assembling the arm 80 to the pedal 70, two positioning members 96, each of which is shaped in a cylindrical form, are inserted through the through-hole 843 and the through-hole 844, and positioning projections 961, which are formed at one end portions of the positioning members 96, are inserted into the positioning recess 921 and the positioning recess 922, respectively (see FIG. 14). Here, the positioning planar portion 911 and the positioning planar portion 912 are configured to engage with an outer peripheral wall of the positioning projection 961 formed at the positioning member 96 which serves as another member.

In the present embodiment, at the time of assembling the arm 80 to the pedal 70, the positioning projections 961 of the two positioning members 96 are inserted into the positioning recess 921 and the positioning recess 922, respectively. In this state, relative movement between the arm 80 and the pedal 70 in the direction perpendicular to the plane of the positioning planar portion 91 is limited, and relative movement between the arm 80 and the pedal 70 in the direction parallel to the plane of the positioning planar portion 91 is enabled to allow adjustment of the assembling position of the arm 80 relative to the pedal 70.

After the assembling of the arm 80 to the pedal 70, the positioning members 96 may either be left inserted into the positioning recess 921 and the positioning recess 922 or be removed from the positioning recess 921 and the positioning recess 922.

Fifth Embodiment

Figure 15:
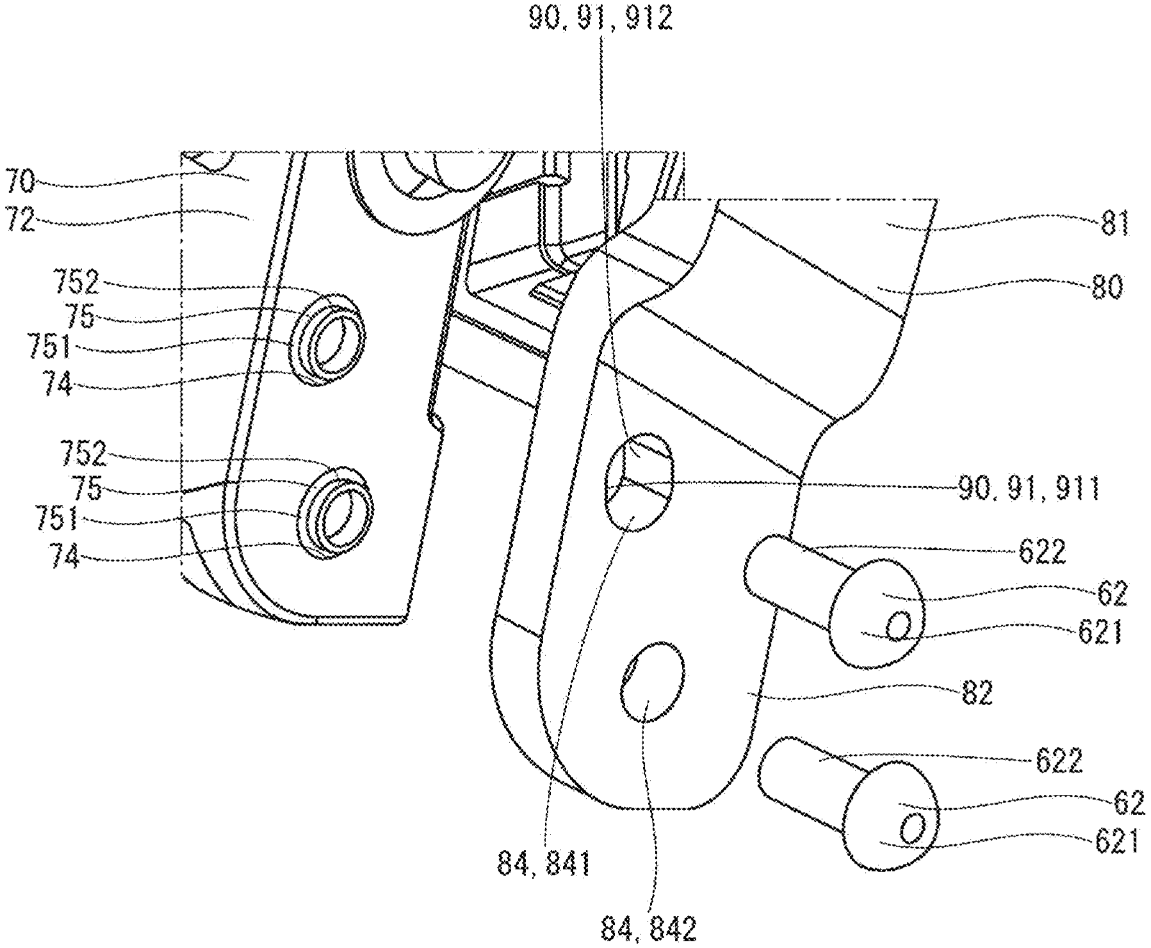
FIG. 15 is a perspective view showing a portion of an accelerator device according to a fifth embodiment.
Figure 16:
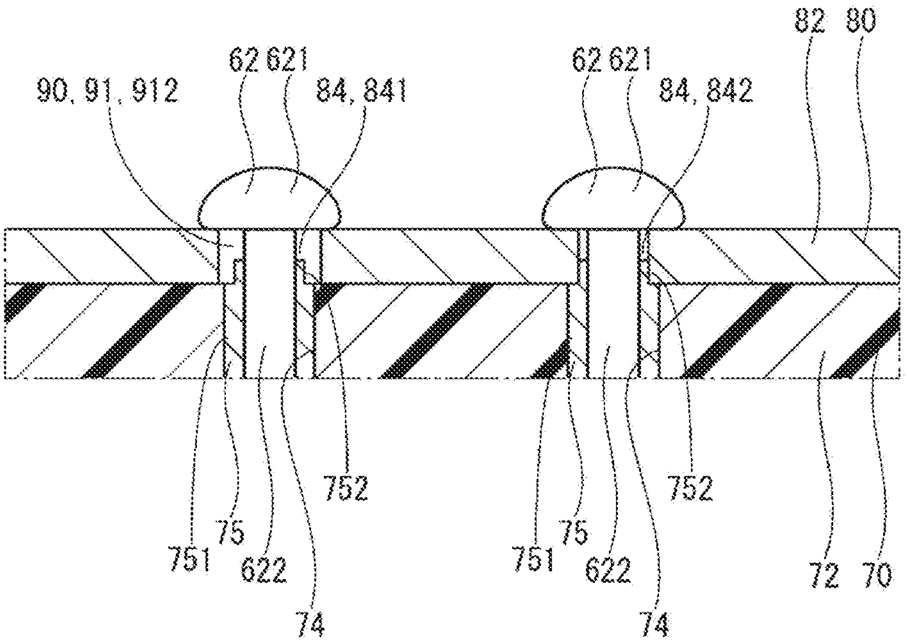
FIG. 16 is a cross-sectional view showing a portion of the accelerator device according to the fifth embodiment.

FIGS. 15 and 16 show part of an accelerator device according to the fifth embodiment. The fifth embodiment differs from the first embodiment with respect to the structure of the pedal 70.

In the present embodiment, each of the nuts 75 has a nut main body 751 and a nut extension tubular portion 752. The nut main body 751 is shaped in tubular form. The nut extension tubular portion 752 is formed integrally with the nut main body 751 in one-piece such that the nut extension tubular portion 752 projects in the tubular form from an inner peripheral edge of an end surface of the nut main body 751 in an axial direction. An outer diameter of the nut extension tubular portion 752 is smaller than an outer diameter of the nut main body 751.

The outer diameter of the nut extension tubular portion 752 is slightly smaller than the width of the through-hole 841 in the transverse direction perpendicular to the longitudinal direction of the through-hole 841 and is smaller than the width of the through-hole 841 in the longitudinal direction. Furthermore, the outer diameter of the nut extension tubular portion 752 is slightly smaller than the inner diameter of the through-hole 842.

The positioning planar portion 911 and the positioning planar portion 912 are configured to engage with an outer peripheral wall of the nut extension tubular portion 752 of the nut 75 which serves as another member.

In the present embodiment, at the time of assembling the arm 80 to the pedal 70, the nut extension tubular portions 752 of the two nuts 75 are inserted into the through-hole 841 and the through-hole 842, respectively. In this state, relative movement between the arm 80 and the pedal 70 in the direction perpendicular to the plane of the positioning planar portion 91 is limited, and relative movement between the arm 80 and the pedal 70 in the direction parallel to the plane of the positioning planar portion 91 is enabled to allow adjustment of the assembling position of the arm 80 relative to the pedal 70.

Other Embodiments

In the embodiments described above, there is described the example where the arm is fixed to the pedal with the two fastener members. In contrast, in another embodiment, the arm may be fixed to the pedal with one fastener member or with three or more fastener members.

Furthermore, in another embodiment, the wall surface of the floor panel of the vehicle, to which the reaction force application device and the accelerator device are installed, is not necessarily formed parallel to the y-z plane. That is, the wall surface of the floor panel may be formed at any angle relative to the vehicle.

Furthermore, the reaction force application device and the accelerator device according to the present disclosure may also be applied to vehicles other than the automobiles.

The characteristics of the present disclosure are as follows.

(Disclosure 1)

According to disclosure 1, there is provided an accelerator device including:

a pedal that is configured to be depressed by a human driver;

an arm that is coupled to the pedal and is configured to receive a reaction force from a reaction force application device, wherein the reaction force application device is configured to apply the reaction force to the arm against a pedal force applied from the human driver to the pedal;

a fastener member that is configured to fix the arm to the pedal; and a positioner that is configured to limit relative movement between the arm and the pedal, wherein:

the arm has:

a connector that is coupled with the pedal; and a through-hole that is formed at the connector and receives the fastener member through the through-hole; and the positioner includes two positioning planar portions which are parallel to each other and are configured to engage with another member.

(Disclosure 2)

According to disclosure 2, there is provided the accelerator device according to disclosure 1, wherein:

the fastener member is one of a plurality of fastener members; and the two positioning planar portions are parallel to a straight line that connects between corresponding two of the plurality of fastener members.

(Disclosure 3)

According to disclosure 3, there is provided the accelerator device according to disclosure 1 or 2, wherein:

the arm has a reaction force receiving contact surface that is configured to contact a lever of the reaction force application device configured to apply the reaction force to the arm, wherein the reaction force receiving contact surface is configured to receive the reaction force; and the two positioning planar portions are parallel to the reaction force receiving contact surface.

(Disclosure 4)

According to disclosure 4, there is provided the accelerator device according to any one of disclosures 1 to 3, wherein the two positioning planar portions are formed at the through-hole.

(Disclosure 5)

According to disclosure 5, there is provided the accelerator device according to any one of disclosures 1 to 4, wherein:

the positioner includes:

a positioning recess that is formed at one of the pedal and the connector; and a positioning projection that is formed at another one of the pedal and the connector and is configured to be inserted into the positioning recess; and the two positioning planar portions are formed at least in the positioning recess among the positioning recess and the positioning projection.

As described above, the present disclosure is not limited to the embodiments described above and can be implemented in various forms without departing from the spirit of the present disclosure.

The present disclosure has been described with reference to the embodiments. However, the present disclosure is not limited to the above embodiments and the structures described therein. The present disclosure also includes various variations and variations within the equivalent range. Also, various combinations and forms, as well as other combinations and forms that include only one element, more, or less, are within the scope and ideology of the present disclosure.

What is claimed is:

1. An accelerator device comprising:

a pedal that is configured to be depressed by a human driver;

an arm that is coupled to the pedal and is configured to receive a reaction force from a reaction force application device, wherein the reaction force application device is configured to apply the reaction force to the arm against a pedal force applied from the human driver to the pedal;

a fastener member that is configured to fix the arm to the pedal; and a positioner that is configured to limit relative movement between the arm and the pedal, wherein:

the arm has:

a connector that is coupled with the pedal; and a through-hole that is formed at the connector and receives the fastener member through the through-hole;

the positioner includes two positioning planar portions which are parallel to each other and are configured to engage with another member;

the fastener member is one of a plurality of fastener members; and the two positioning planar portions are parallel to a straight line that connects between corresponding two of the plurality of fastener members.

2. The accelerator device according to claim 1, wherein the two positioning planar portions are formed at the through-hole.

3. An accelerator device comprising:

a pedal that is configured to be depressed by a human driver;

an arm that is coupled to the pedal and is configured to receive a reaction force from a reaction force application device, wherein the reaction force application device is configured to apply the reaction force to the arm against a pedal force applied from the human driver to the pedal;

a fastener member that is configured to fix the arm to the pedal; and a positioner that is configured to limit relative movement between the arm and the pedal, wherein:

the arm has:

a connector that is coupled with the pedal; and a through-hole that is formed at the connector and receives the fastener member through the through-hole;

the positioner includes two positioning planar portions which are parallel to each other and are configured to engage with another member;

the arm has a reaction force receiving contact surface that is configured to contact a lever of the reaction force application device configured to apply the reaction force to the arm, wherein the reaction force receiving contact surface is configured to receive the reaction force; and the two positioning planar portions are parallel to the reaction force receiving contact surface.

4. The accelerator device according to claim 3, wherein:

the fastener member is one of a plurality of fastener members; and the two positioning planar portions are parallel to a straight line that connects between corresponding two of the plurality of fastener members.

5. The accelerator device according to claim 3, wherein the two positioning planar portions are formed at the through-hole.

6. An accelerator device comprising:

a pedal that is configured to be depressed by a human driver;

an arm that is coupled to the pedal and is configured to receive a reaction force from a reaction force application device, wherein the reaction force application device is configured to apply the reaction force to the arm against a pedal force applied from the human driver to the pedal;

a fastener member that is configured to fix the arm to the pedal; and a positioner that is configured to limit relative movement between the arm and the pedal, wherein:

the arm has:

a connector that is coupled with the pedal; and a through-hole that is formed at the connector and receives the fastener member through the through-hole;

the positioner includes two positioning planar portions which are parallel to each other and are configured to engage with another member;

the positioner includes:

a positioning recess that is formed at one of the pedal and the connector; and a positioning projection that is formed at another one of the pedal and the connector and is configured to be inserted into the positioning recess; and the two positioning planar portions are formed at least in the positioning recess among the positioning recess and the positioning projection.

7. The accelerator device according to claim 6, wherein:

the fastener member is one of a plurality of fastener members; and the two positioning planar portions are parallel to a straight line that connects between corresponding two of the plurality of fastener members.

8. The accelerator device according to claim 6, wherein:

the arm has a reaction force receiving contact surface that is configured to contact a lever of the reaction force application device configured to apply the reaction force to the arm, wherein the reaction force receiving contact surface is configured to receive the reaction force; and the two positioning planar portions are parallel to the reaction force receiving contact surface.

* * * * *